(12) United States Patent
Mcgonigle et al.

(10) Patent No.: US 12,458,295 B2
(45) Date of Patent: Nov. 4, 2025

(54) SYSTEM AND METHOD FOR CORRECTING FOR ERRORS DEPENDENT UPON SPECTRAL CHARACTERISTICS OF TISSUE

(71) Applicant: Covidien LP, Mansfield, MA (US)

(72) Inventors: Scott J. Mcgonigle, Loanhead (GB); Jacob D. Dove, Lafayette, CO (US); Clark R. Baker, Jr., Newman, CA (US); Keith A. Batchelder, Boulder, CO (US); Christopher J. Meehan, Denver, CO (US); David M. VandeRiet, Lafayette, CO (US); Chekema N. Prince, Morganville, NJ (US); Linden A. Reustle, Milliken, CO (US)

(73) Assignee: Covidien LP, Mansfield, MA (US)

( * ) Notice: Subject to any disclaimer, the term of this patent is extended or adjusted under 35 U.S.C. 154(b) by 545 days.

(21) Appl. No.: 17/958,778

(22) Filed: Oct. 3, 2022

(65) Prior Publication Data

US 2023/0103378 A1   Apr. 6, 2023

Related U.S. Application Data

(60) Provisional application No. 63/251,341, filed on Oct. 1, 2021.

(51) Int. Cl.
*A61B 5/1455* (2006.01)
*A61B 5/00* (2006.01)

(52) U.S. Cl.
CPC ............ *A61B 5/72* (2013.01); *A61B 5/14551* (2013.01); *A61B 2560/0223* (2013.01)

(58) Field of Classification Search
CPC . A61B 5/0205; A61B 5/1455; A61B 5/14551; A61B 5/14552; A61B 5/1495; A61B 5/72; A61B 5/021; A61B 5/0075; A61B 5/02416; A61B 2560/0223
See application file for complete search history.

(56) References Cited

U.S. PATENT DOCUMENTS

| | | | |
|---|---|---|---|
| 6,151,107 A * | 11/2000 | Schollermann | A61B 5/14551 356/41 |
| 6,839,580 B2 * | 1/2005 | Zonios | A61B 5/1495 600/323 |
| 7,343,186 B2 | 3/2008 | Lamego et al. | |
| 7,392,074 B2 | 6/2008 | Isaacson et al. | |
| 7,606,606 B2 | 10/2009 | Laakkonen | |
| 8,315,682 B2 | 11/2012 | Such et al. | |
| 8,346,327 B2 | 1/2013 | Campbell et al. | |
| 8,401,605 B2 | 3/2013 | Huiku | |
| 8,720,249 B2 | 5/2014 | Al-Ali | |
| 8,740,808 B2 | 6/2014 | Curti et al. | |
| 8,781,544 B2 | 7/2014 | Al-Ali et al. | |
| 9,107,625 B2 | 8/2015 | Telfort et al. | |
| 9,125,606 B2 | 9/2015 | Verkruijsse et al. | |
| 9,265,456 B2 | 2/2016 | Kirenko et al. | |
| 9,314,165 B2 | 4/2016 | Shuler | |

(Continued)

*Primary Examiner* — Chu Chuan Liu
(74) *Attorney, Agent, or Firm* — Draft Masters IP, LLC

(57) ABSTRACT

The present disclosure provides systems and methods for correcting for errors dependent upon spectral characteristics of tissue for a medical device by estimating a spectral characteristic of tissue providing error due to scattering or absorption of emitted light based upon a ratio of measurements for a patient.

16 Claims, 5 Drawing Sheets

(56) References Cited

U.S. PATENT DOCUMENTS

| | | |
|---|---|---|
| 9,341,565 B2 | 5/2016 | Lamego et al. |
| 9,364,175 B2 | 6/2016 | Benni |
| 9,649,055 B2 | 5/2017 | Ashe et al. |
| 9,693,717 B2 | 7/2017 | Benni et al. |
| 9,770,197 B2 | 9/2017 | Bresch et al. |
| 9,770,213 B2 | 9/2017 | Kirenko et al. |
| 9,801,556 B2 | 10/2017 | Kiani |
| 9,839,381 B1 | 12/2017 | Weber et al. |
| 9,844,348 B2 | 12/2017 | Mannheimer et al. |
| 9,980,650 B2 | 5/2018 | Bezemer |
| 10,039,455 B2 | 8/2018 | Lading et al. |
| 10,064,562 B2 | 9/2018 | Al-Ali |
| 10,092,200 B2 | 10/2018 | Al-Ali et al. |
| 10,117,587 B2 | 11/2018 | Han |
| 10,313,137 B2 | 6/2019 | Aarnio et al. |
| 10,433,739 B2 | 10/2019 | Weekly et al. |
| 10,531,820 B2 | 1/2020 | De Haan et al. |
| 10,646,167 B2 | 5/2020 | De Haan |
| 10,799,149 B2 | 10/2020 | Freeman et al. |
| 10,918,321 B2 | 2/2021 | Benni |
| 10,993,644 B2 | 5/2021 | Huiku et al. |
| 11,123,023 B2 | 9/2021 | Babaeizadeh |
| 11,147,518 B1 | 10/2021 | Al-Ali et al. |
| 11,202,582 B2 | 12/2021 | Verkruijsse et al. |
| 11,564,630 B2 | 1/2023 | Huiku et al. |
| 11,653,862 B2 | 5/2023 | Dalvi et al. |
| 11,839,470 B2 | 12/2023 | Kiani et al. |
| 2010/0076319 A1* | 3/2010 | Mannheimer ...... A61B 5/14551 600/476 |
| 2016/0313176 A1 | 10/2016 | Lee |
| 2017/0273560 A1 | 9/2017 | Ballam et al. |
| 2019/0175030 A1 | 6/2019 | Verkruijsse et al. |
| 2019/0209025 A1 | 7/2019 | Al-Ali |
| 2021/0219884 A1 | 7/2021 | De Haan |
| 2023/0015851 A1 | 1/2023 | Verkruijsse et al. |
| 2023/0103406 A1 | 4/2023 | Meehan et al. |
| 2023/0125960 A1 | 4/2023 | Weber et al. |

\* cited by examiner

SYSTEM AND METHOD FOR CORRECTING FOR ERRORS DEPENDENT UPON SPECTRAL CHARACTERISTICS OF TISSUE

CROSS-REFERENCE TO RELATED APPLICATIONS

This application claims the benefit of U.S. Provisional Application No. 63/251,341, filed Oct. 1, 2021, the disclosure of which is incorporated herein by reference in its entirety.

FIELD

The present disclosure relates generally to medical devices, and more particularly to correction of errors in medical device measurements to spectral characteristics in tissue, for example for measurements using pulse oximeters to correct for scattering or absorption errors due to skin pigmentation.

BACKGROUND

In the field of medicine, doctors often desire to monitor certain physiological characteristics of their patients. Accordingly, a wide variety of devices have been developed for monitoring many such physiological characteristics. Such devices provide doctors and other healthcare personnel with the information they need to provide the best possible healthcare for their patients. As a result, such monitoring devices have become an indispensable part of modern medicine.

One technique for monitoring certain physiological characteristics of a patient uses attenuation of light to determine physiological characteristics of a patient. This is used in pulse oximetry, and the devices built based upon pulse oximetry techniques. Light attenuation is also used for regional or cerebral oximetry. Oximetry may be used to measure various blood characteristics, such as the oxygen saturation of hemoglobin in blood or tissue, the volume of individual blood pulsations supplying the tissue, and/or the rate of blood pulsations corresponding to each heartbeat of a patient. The signals can lead to further physiological measurements, such as respiration rate, glucose levels or blood pressure.

Pulse oximetry is often used to noninvasively measure arterial blood oxygenation. To measure blood oxygenation, two optical sources, typically light-emitting-diodes (LEDs), may be used to inject light into the tissue. A photodiode is used to capture the light after propagating through blood perfused tissue. During a cardiac cycle, the amount of blood in the optical path changes which changes the amount of absorbed light. As more light is absorbed, the photodiode produces less photocurrent. Hence, during the cardiac cycle, the photocurrent from the photodiode is modulated. As blood oxygenation changes, the relative change in the modulated light at two distinct wavelengths changes. This relative change in the modulated photocurrent is processed (e.g., signal conditioning, various algorithms) by the oximetry unit to estimate the arterial functional oxygenation ($SpO_2$).

The present disclosure recognizes that physiological factors of tissue vary, providing varying amounts of light scattering or absorption between different tissue types, causing error in the measurement. For example, the spectrum of skin pigmentations can result in LED light for a pulse oximeter being scattered and absorbed differently. Thus, skin pigmentation (or other characteristics of tissue causing light scattering or absorption (spectral characteristics of tissue), e.g., density, damage, etc.)) can contribute to error in the $SpO_2$ measurement.

What is needed in the art are improved techniques to increase accuracy of pulse oximeter sensor measurements that accounts for error dependent upon spectral characteristics of tissue.

SUMMARY

The techniques of this disclosure generally relate to correction of errors in medical device measurements to spectral characteristics in tissue, for example for measurements using pulse oximeters to correct for scattering or absorption errors due to skin pigmentation.

In exemplary embodiments, a photoplethysmography (PPG) sensor, such as a pulse oximeter, includes emitters for least two wavelengths of light, such as one red light source and at least one infrared source, which may be, e.g., LEDs. A comparison of the detected signals for those two wavelengths of light can provide an indication of a degree of scattering or absorption by target tissue and provide the basis (e.g., a correction factor) for correction of errors dependent thereon.

In further exemplary embodiments, a system and method for correcting for errors dependent upon spectral characteristics of tissue for a medical device provide a medical device that: includes a sensor having at least one red LED configured for LED emission of a red wavelength through tissue and at least one infrared LED configured for LED emission of an infrared wavelength through tissue; estimates a spectral characteristic of tissue providing error due to scattering or absorption of emitted light based upon a ratio of measurements for a patient, the ratio selected from one of: (1) Ratio=$Red_{DC}/IR_{DC}$; (2) Ratio=$SpO_2/(Red_{DC}/IR_{DC})$; and (3) Ratio=$SpO_2^2/(Red_{DC}/IR_{DC})$; retrieves correction data from sensor memory; determines a spectral characteristic correction factor based upon the selected ratio and the correction data from sensor memory; and applies the spectral characteristic correction factor to a pulse oximetry measurement to correct for the error dependent upon the estimated spectral characteristic of tissue.

In further exemplary embodiments, in ratios (2) and (3), the $SpO_2$ term may be substituted for the ratio of ratios "RoR" equation (i.e., $(Red_{AC}/Red_{DC})/(IR_{AC}/IR_{DC})$).

It is also noted that the ratios described herein may also be calculated after normalization for system or sensor characteristics, such as LED current, amplifier gain, LED efficiency, photodetector sensitivity, compensation for LED forward voltage changes relative to a value stored in memory, e.g., at sensor calibration or manufacture (acting e.g., an LED/sensor-site temperature proxy) or any other compensation for LED wavelength shift due to environmental changes, etc.

In exemplary embodiments, the calculation accounts for each optical signal having two components, including a part of the signal that is modulated with the heart beat (referred to as the "AC portion" of the signal) and a part of the signal that does not change with the heart beat (referred to as the "DC portion" of the signal). An exemplary additional ratio term may be provided that is normalized for the measured power ratio of the LEDs, e.g., as: $Ratio_{norm}=((Red_{DC}/IR_{DC})/(Red_{LED}/IR_{LED}))$, wherein $Red_{LED}$ and $IR_{LED}$ are the measured total spectral flux from the Red and IR LEDs, respectively, which values may be stored on sensor memory, e.g., an EEPROM.

In further exemplary embodiments, the correction is a modification of the slope of a measured saturation curve using custom coefficients or modification of existing coefficients, modification of a saturation number directly, or modification of a ratio of ratios measurement, and/or includes a power ratio, gamma or other calibration coefficients or equations set at manufacturing, or includes a modification of existing power ratio, gamma or other calibration coefficients or equations.

In further exemplary embodiments a correction includes a new power ratio, gamma or other calibration coefficients or equations stored in memory on the medical sensor, or is a modification of existing power ratio, gamma or other calibration coefficients or equations stored in memory on the medical sensor. In further exemplary embodiments, the selected ratio is averaged over a period of time. Additionally, $IR_{DC}$ and $Red_{DC}$ values may be inferred from the $IR_{LEDDrive}$ and $Red_{LEDDrive}$ drive currents and used as proxies for the $IR_{DC}$ and $Red_{DC}$ values. In additional exemplary embodiments, a large difference between $Red_{LEDDrive}$ and $IR_{LEDDrive}$, or where $Red_{LEDDRIVE}$ is maxed out and $IR_{LEDDRIVE}$ is low, indicates a darker pigmented subject.

In further exemplary embodiments, the selected ratio data is combined with at least one other algorithm signal to train a Neural Network classifier to improve estimation of the spectral characteristic of tissue, and wherein the at least one other algorithm signal includes one or more of: $IR_{DC}$ (nAvs); $Red_{DC}$ (nAvs); $SpO_2$; Ratio of Ratios; Percent Modulation IR (%); Percent Modulation Red (%); Pulse Rate (bpm); skewness; pulse amplitude (AC), pulse rate; kurtosis; and ratios of fiducial points within the pulse or derivative signals.

For clarification, the term "nAvs" relates to nanoamperes of photocurrent received by the photodetector from the LED (after cancelling ambient light). The "v" within "nAvs" stands for "virtual" and refers to what the photocurrent would be were the LED current at a nominal current, e.g., 50 mA. This provides a metric of how light absorbing a sensor site is. "nAvs" refers to plural signals demultiplexed from multiple light sources (LED wavelengths), whereas the singular (without the "v") is "nAI", where "I" stands for "referred to input". The above serves to emphasize that normalization is provided for the current drive, which is standardized.

In further exemplary embodiments, the estimated characteristic of tissue is skin pigmentation; and a predetermined threshold for estimation of the spectral characteristic of tissue is compared with the selected ratio to separate a selected pigment group from other predetermined groups.

In further exemplary embodiments, a reflected signal is utilized to estimate error due to scattering or absorption according to the spectral characteristic of tissue, and wherein the correction is applied to normalize a measurement of $SpO_2$ or hemoglobin. As is used herein, the term "reflected" refers to an arrangement wherein an emitter and a detector are on the same side of tissue, as opposed to "transmission", e.g., used in digit sensors where the emitter and detector are on opposite sides.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
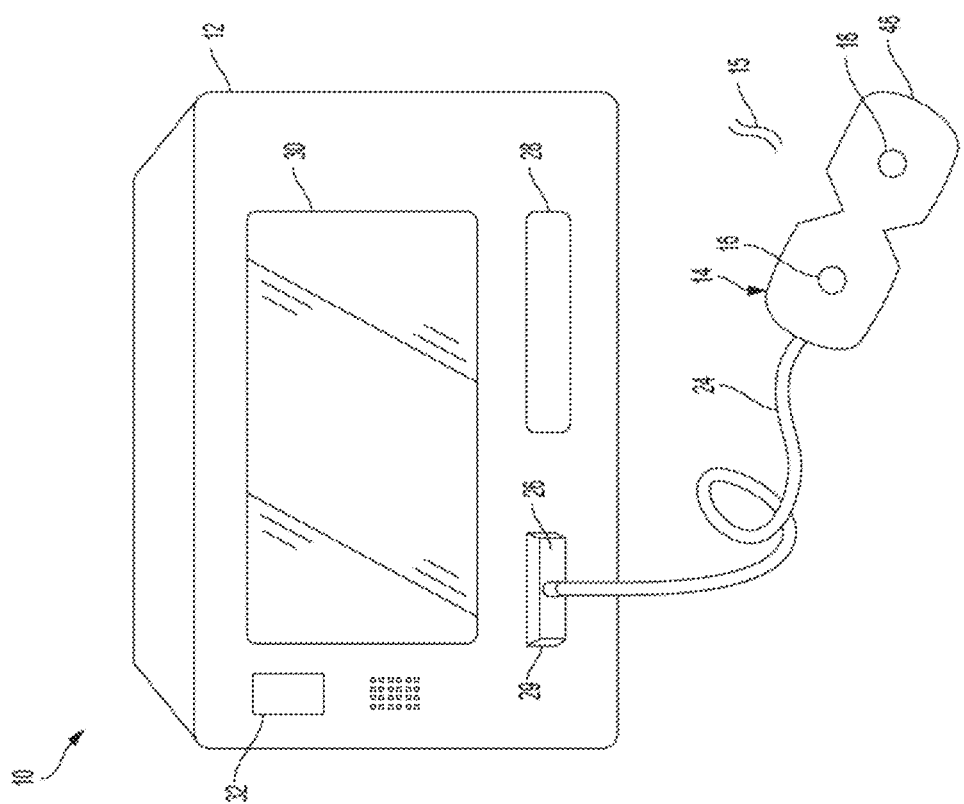
FIG. 1 illustrates a perspective view of an exemplary patient monitoring system including a patient monitor and a patient monitoring sensor, in accordance with an embodiment.

The present disclosure describes systems and methods for correction of errors in medical device measurements, wherein at least one spectral characteristic of tissue are estimated or measured to correct for measurement error. As will be described in more detail below, the present disclosure provides systems and methods for correction of errors for photoplethysmography (PPG) measurements, and in exemplary embodiments, for pulse oximetry measurements, wherein at least one spectral characteristic of tissue are estimated or measured according to a comparison of detection of signals by light sources emitting of at least two different wavelengths of light.

As we have noted above, oximetry is used in the clinical setting to noninvasively measure characteristics of the blood. For example, pulse oximetry typically is used to estimate arterial blood oxygenation. To estimate blood oxygenation, two optical sources, typically light-emitting-diodes (LEDs), are used to inject light into the tissue. A photodiode is used to capture the light after propagating through blood perfused tissue. During a cardiac cycle the amount of blood in the optical path changes which changes the amount the light that is absorbed. As more light is absorbed, the photodiode produces less photocurrent. Hence, during the cardiac cycle, the photocurrent form the photodiode is modulated. As blood oxygenation changes, the relative change in the modulated light at two distinct wavelengths changes. This relative change in the modulated photocurrent is processed (e.g. signal conditioning, various algorithms) by the oximetry unit to estimate the arterial functional oxygenation ($SpO_2$).

As $SpO_2$ is measured optically, physiological factors that scatter or absorb light differently, within the spectral bandwidth of interest, can cause error. Specifically, differences in tissue characterization, e.g., skin pigmentation, skin density, skin abnormalities or scarring, etc., can result in the LED light being scattered and absorbed differently. Hence, such tissue characteristics can contribute to error in the $SpO_2$ estimate. With specific regard to skin pigmentation, more darkly pigmented skin can bias $SpO_2$ readings, e.g., due to the difference in tissue characteristics.

Exemplary embodiments provide for estimation of such physiological factors or tissue characteristics that cause such scattering or absorption of one or more wavelengths of light. For purposes of this disclosure, we describe various techniques for estimation of physiological factors or tissue characteristics, comparison of detected signal intensity levels at different wavelengths and detection of patients with low saturation slope or high bias at low saturation, among others. Such estimation may be at higher or lower levels of confidence or specificity, and can correlate to predefined corrective factors or equations to account for error according to the scattering or absorption attributed to the physiological factors or tissue characteristics that are estimated.

For examples relating to pigmentation (as an example of a spectral characteristic of tissue), one indicator may be related to a correlation between tissue that highly attenuates light versus tissue that does not highly attenuate light, and one or more relatively lower Red signal intensity levels (e.g., a normalized LED signal level ("nAvs")) detected by a detector versus one or more Infra-Red signal intensity levels detected by a detector (the same or different detector, dependent upon design, detector sensitivity, etc.). Such indicator(s) may then be used to provide one or more correction factors/adjustments/coefficients/etc., which may modify or be applied in addition to other correction factors, e.g., existing gamma coefficients (as a linearization correction), or other coefficients used to convert ratio-of-ratio (RoR) measurements to a saturation ($SpO_2$). For example, power ratios, gamma or other calibration coefficients, equations, etc., may be used or modified in exemplary embodiments to correct the measured signal(s) or to otherwise adjust for such determined errors in measurement, which may include to $SpO_2$ values.

For purposes of illustration, an exemplary tissue characterization (skin pigmentation) will be discussed initially. However, it should be recognized that any tissue characterization that causes differential attenuation of light, e.g., by scattering or absorption of one or more wavelengths of light, are relevant to the present discussion of correction of error dependent thereon.

FIG. 1 illustrates an embodiment of a patient monitoring system 10 that includes a patient monitor 12 and a sensor 14, such as a pulse oximetry sensor, to monitor physiological parameters of a patient. By way of example, the sensor 14 may be a NELLCOR™, or INVOS™ sensor available from Medtronic (Boulder, CO), or another type of oximetry sensor. Although the depicted embodiments relate to sensors for use on a patient's fingertip, toe, or earlobe, it should be understood that, in certain embodiments, the features of the sensor 14 as provided herein may be incorporated into sensors for use on other tissue locations, such as the forehead and/or temple, the heel, stomach, chest, back, or any other appropriate measurement site.

In the embodiment of FIG. 1, the sensor 14 is a pulse oximetry sensor that includes one or more emitters 16 and one or more detectors 18. For pulse oximetry applications, the emitter 16 transmits at least two wavelengths of light (e.g., red and/or infrared (IR)) into a tissue of the patient. For other applications, the emitter 16 may transmit 3, 4, or 5 or more wavelengths of light into the tissue of a patient. The detector 18 is a photodetector selected to receive light in the range of wavelengths emitted from the emitter 16, after the light has passed through the tissue. Additionally, the emitter 16 and the detector 18 may operate in various modes (e.g., reflectance or transmission). In certain embodiments, the sensor 14 includes sensing components in addition to, or instead of, the emitter 16 and the detector 18.

As is used herein, the term "reflected" refers to an arrangement wherein an emitter and a detector are on the same side of tissue, as opposed to "transmission", e.g., used in digit sensors where the emitter and detector are on opposite sides.

The sensor 14 also includes a sensor body 46 to house or carry the components of the sensor 14. In exemplary embodiments, the body 46 includes a backing, or liner, provided around the emitter 16 and the detector 18, as well as an adhesive layer (not shown) on the patient side. The sensor 14 may be reusable (such as a durable plastic clip sensor), disposable (such as an adhesive sensor including a bandage/liner at least partially made from hydrophobic materials), or partially reusable and partially disposable.

In the embodiment shown, the sensor 14 is communicatively coupled to the patient monitor 12. In certain embodiments, the sensor 14 may include a wireless module configured to establish a wireless communication 15 with the patient monitor 12 using any suitable wireless standard. For example, the sensor 14 may include a transceiver that enables wireless signals to be transmitted to and received from an external device (e.g., the patient monitor 12, a charging device, etc.). The transceiver may establish wireless communication 15 with a transceiver of the patient monitor 12 using any suitable protocol. For example, the transceiver may be configured to transmit signals using one or more of the ZigBee standard, 802.15.4x standards WirelessHART standard, Bluetooth standard, IEEE 802.11x standards, or MiWi standard. Additionally, the transceiver may transmit a raw digitized detector signal, a processed digitized detector signal, and/or a calculated physiological parameter, as well as any data that may be stored in the sensor, such as calibration data or coefficients, such as gamma coefficients, data relating to wavelengths of the emitters 16, or data relating to input specification for the emitters 16, as discussed below. Additionally, or alternatively, the emitters 16 and detectors 18 of the sensor 14 may be coupled to the patient monitor 12 via a cable 24 through a plug 26 (e.g., a connector having one or more conductors) coupled to a sensor port 29 of the monitor. In certain embodiments, the sensor 14 is configured to operate in both a wireless mode and a wired mode. Accordingly, in certain embodiments, the cable 24 is removably attached to the sensor 14 such that the sensor 14 can be detached from the cable to increase the patient's range of motion while wearing the sensor 14.

The patient monitor 12 is configured to calculate physiological parameters of the patient relating to the physiological signal received from the sensor 14. For example, the patient monitor 12 may include a processor configured to calculate the patient's arterial blood oxygen saturation, tissue oxygen saturation, pulse rate, respiration rate, blood pressure, blood pressure characteristic measure, autoregulation status, brain activity, and/or any other suitable physiological characteristics. Additionally, the patient monitor 12 may include a monitor display 30 configured to display information regarding the physiological parameters, information about the system (e.g., instructions for disinfecting and/or charging the sensor 14), and/or alarm indications. The patient monitor 12 may include various input components 32, such as knobs, switches, keys and keypads, buttons, etc., to provide for operation and configuration of the patient monitor 12. The patient monitor 12 may also display information related to alarms, monitor settings, and/or signal quality via one or more indicator lights and/or one or more speakers or audible indicators. The patient monitor 12 may also include an upgrade slot 28, in which additional modules can be inserted so that the patient monitor 12 can measure and display additional physiological parameters.

Because the sensor 14 may be configured to operate in a wireless mode and, in certain embodiments, may not receive power from the patient monitor 12 while operating in the wireless mode, the sensor 14 may include a battery to provide power to the components of the sensor 14 (e.g., the emitter 16 and the detector 18). In certain embodiments, the battery may be a rechargeable battery such as, for example, a lithium ion, lithium polymer, nickel-metal hydride, or nickel-cadmium battery. However, any suitable power source may be utilized, such as, one or more capacitors and/or an energy harvesting power supply (e.g., a motion generated energy harvesting device, thermoelectric generated energy harvesting device, or similar devices).

As noted above, in an embodiment, the patient monitor 12 is a pulse oximetry monitor and the sensor 14 is a pulse oximetry sensor. The sensor 14 may be placed at a site on a patient with pulsatile arterial flow, typically a fingertip, toe, forehead or earlobe, or in the case of a neonate, across a hand or foot, etc. Additional suitable sensor locations include, without limitation, the neck to monitor carotid artery pulsatile flow, the wrist to monitor radial artery pulsatile flow, the inside of a patient's thigh to monitor femoral artery pulsatile flow, the ankle to monitor tibial artery pulsatile flow, and around or in front of the ear. The patient monitoring system 10 may include sensors 14 at multiple locations. The emitter 16 emits light which passes through the blood perfused tissue, and the detector 18 photoelectrically senses the amount of light reflected or transmitted by the tissue. The patient monitoring system 10 measures the intensity of light that is received at the detector 18 as a function of time.

A signal representing light intensity versus time or a mathematical manipulation of this signal (e.g., a scaled version thereof, a log taken thereof, a scaled version of a log taken thereof, etc.) may be referred to as the photoplethysmograph (PPG) signal. In addition, the term "PPG signal," as used herein, may also refer to an absorption signal (i.e., representing the amount of light absorbed by the tissue) or any suitable mathematical manipulation thereof. The amount of light detected or absorbed may then be used to calculate any of a number of physiological parameters, including oxygen saturation (the saturation of oxygen in pulsatile blood, $SpO_2$), an amount of a blood constituent (e.g., oxyhemoglobin), as well as a physiological rate (e.g., pulse rate or respiration rate) and when each individual pulse or breath occurs. For $SpO_2$, red and infrared (IR) wavelengths may be used because it has been observed that highly oxygenated blood will absorb relatively less Red light and more IR light than blood with a lower oxygen saturation. By comparing the intensities of two wavelengths at different points in the pulse cycle, it is possible to estimate the blood oxygen saturation of hemoglobin in arterial blood, such as from empirical data that may be indexed by values of a ratio, a lookup table, and/or from curve fitting and/or other interpolative techniques.

Figure 2:
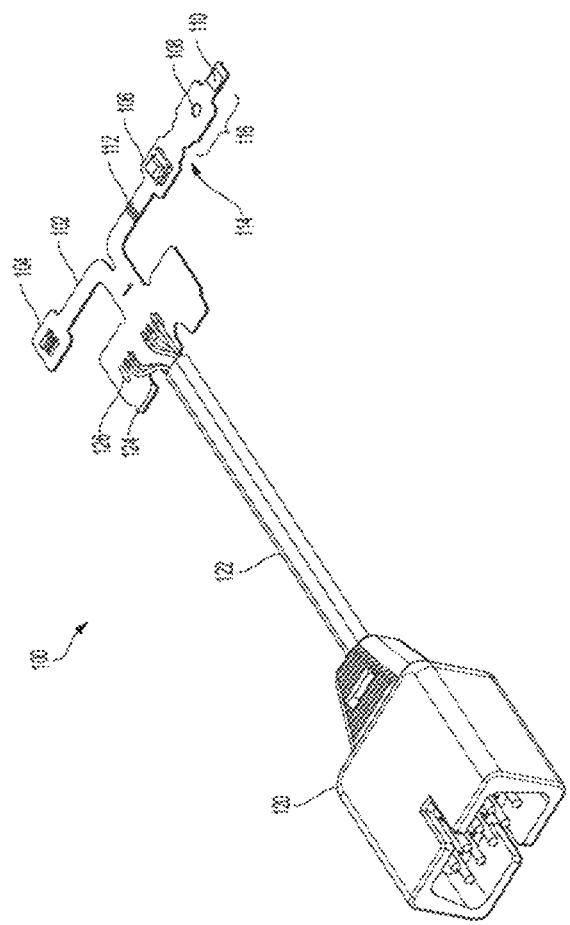
FIG. 2 illustrates a perspective view of an exemplary patient monitoring sensor.

Referring now to FIG. 2, an embodiment of a patient monitoring sensor 100 in accordance with an embodiment is shown. As may be seen, the shape or profile of various components may vary. The sensor 100 includes a body 102 that includes a flexible circuit. The sensor 100 includes one or more LEDs 104 (in this case a surface mount LED package with two LEDs) and one or more detectors 106 disposed on the body 102 of the sensor 100.

While any number of exemplary sensor designs are contemplated herein, in the illustrated exemplary embodiment, the body 100 includes a flap portion 116 that includes an aperture 108. The flap portion 116 is configured to be folded at a hinge portion 114 such that the aperture 108 overlaps the detector 106 to allow light to pass through. In one embodiment, the flap portion 116 includes an adhesive 110 that is used to secure the flap portion 116 to the body 102 after the flap portion 116 is folded at the hinge portion 114 using visual indicator 112 that is used to assure proper alignment of the flap portion 116 when folded at the hinge portion 114.

The sensor 100 includes a plug 120 that is configured to be connected to a patient monitoring system, such as the one shown in FIG. 1. The sensor 100 also includes a cable 122 that connects the plug 120 to the body 102 of the sensor 100. The cable 122 includes a plurality of wires 124 that connect various parts of the plug 120 to terminals 126 disposed on the body 102. The flexible circuit is disposed in the body 102 and connects the terminals 126 to the LED 104 and the detector 106. In addition, one of the terminals 126 connect a ground wire to the flexible circuit.

Figure 3:
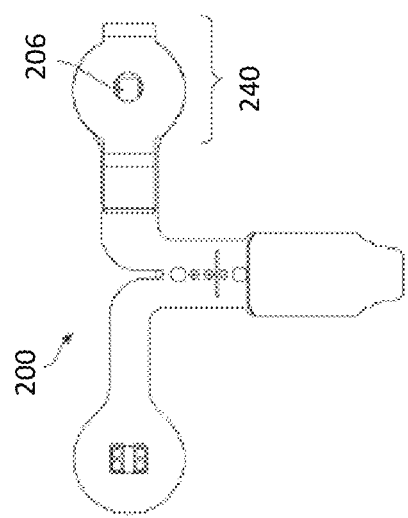
FIG. 3 illustrates a top elevation view of a portion of an assembled exemplary patient monitoring sensor.

Referring now to FIG. 3, a patient monitoring sensor 200 in accordance with an embodiment is shown. In exemplary embodiments, a faraday cage 240 is formed around the detector 206 by folding the flap portion 116 over a portion of the body 102 of the sensor 200.

Skin Pigmentation as a Tissue Characteristic During Pulse Oximetry

In exemplary embodiments, the present disclosure describes systems and methods for estimating subject tissue characteristics from recorded signals during pulse oximetry. As we have noted above, tissue characteristics, in this case, skin pigmentation, can contribute to tissue scattering or absorption of emitted light for one or more measured wavelengths of light.

The below describes several metrics that can be used to attempt to detect the pigmentation (or more generally, spectral characteristics of tissue) of a current subject. Additionally, or in the alternative (instead of estimating pigmentation), subjects may be identified according to a low saturation slope or a high bias at low saturation ($SpO_2$ vs. $SaO_2$).

In a first exemplary embodiment, a ratio of $Red_{DC}$ to $IR_{DC}$ ($Red_{DC}/IR_{DC}$) is calculated, with $IR_{DC}$ being the gain normalized infrared signal intensity in nAvs (equation (1), below). In further embodiments, the $SpO_2$ estimate is also used in the ratio, for example according to equations (2) and (3), in the paragraph below.

These metrics may be used to indicate a likelihood that the subject is darkly pigmented based on thresholds derived from historic training data. In exemplary embodiments, each metric is averaged over a period of time, for example with a minimum of about one to several seconds (e.g., 2 to 30 seconds, 4 to 20 seconds, 5 to ten seconds, etc.).

$$\text{Ratio} = Red_{DC}/IR_{DC} \tag{1}$$

$$\text{Ratio} = SpO_2/(Red_{DC}/IR_{DC}) \tag{2}$$

$$\text{Ratio} = SpO_2^2/(Red_{DC}/IR_{DC}) \tag{3}$$

In further exemplary embodiments, in ratios (2) and (3), the $SpO_2$ term may be substituted for the ratio of ratios "RoR" equation (i.e., $(Red_{AC}/Red_{DC})/(IR_{AC}/IR_{DC})$).

In an exemplary embodiment, $IR_{DC}$ and $Red_{DC}$ values may be inferred from the $IR_{LEDDrive}$ and $Red_{LEDDrive}$ drive currents and used as proxies for the $IR_{DC}$ and $Red_{DC}$ values. In one embodiment, a large difference between $Red_{LEDDrive}$ and $IR_{LEDDrive}$ indicates a darker pigmented subject. In other exemplary embodiments, $Red_{LEDDRIVE}$ is maxed out and $IR_{LEDDRIVE}$ is low, also indicating a darker pigmented subject.

In exemplary embodiments, the calculation accounts for each optical signal having two components, including a part of the signal that is modulated with the heart beat (referred to as the "AC portion" of the signal) and a part of the signal that does not change with the heart beat (referred to as the "DC portion" of the signal). An exemplary additional ratio term may be provided that is normalized for the measured power ratio of the LEDs, e.g., as: $\text{Ratio}_{norm}=((\text{Red}_{DC}/\text{IR}_{DC})/(\text{Red}_{LED}/\text{IR}_{LED}))$, wherein $\text{Red}_{LED}$ and $\text{IR}_{LED}$ are the measured total spectral flux from the Red and IR LEDs, respectively, which values may be stored on sensor memory, e.g., an EEPROM.

It is noted that the ratios described herein may also be calculated after normalization for system or sensor characteristics, such as LED current, amplifier gain, LED efficiency, photodetector sensitivity, etc. For example, in another exemplary embodiment, a performance improvement is provided by carefully measuring the Red/IR power ratio of the individual sensor during manufacturing to more accurately calibrate the signals used to detect pigmentation.

Figure 4:
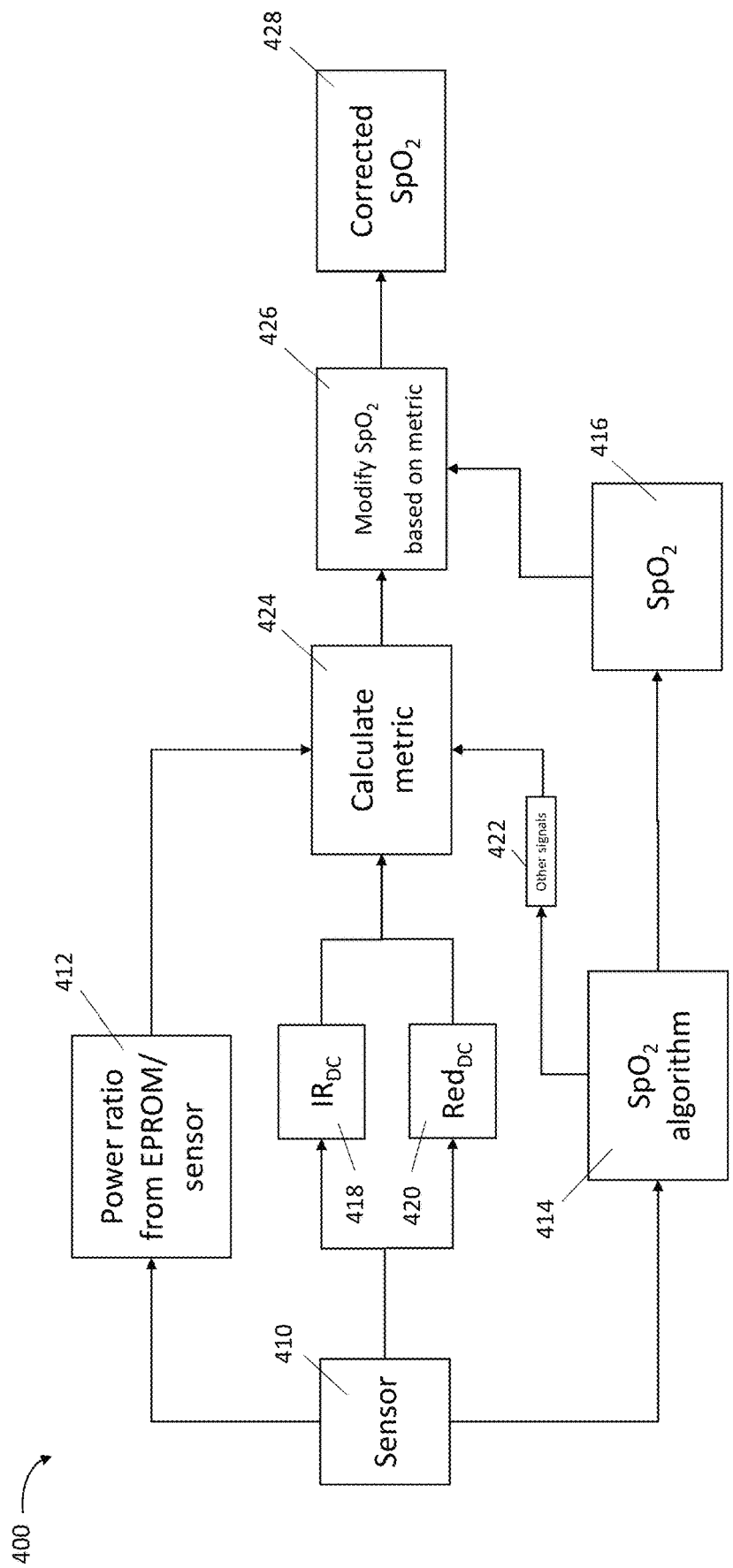
FIG. 4 is an exemplary flowchart illustrating calculation of a metric for correction (or for a correction factor) of $SpO_2$ measurements based on spectral characteristics of tissue.

For example, FIG. 4 illustrates an exemplary flowchart generally at 400, wherein a patient sensor 410 includes memory (e.g., an EEPROM) with a power ratio stored thereon (see 412, as an EEPROM with a power ratio stored thereon). An $\text{SpO}_2$ algorithm 414 is utilized, e.g., by a processor on a monitor or other location, to provide an $\text{SpO}_2$ measurement (at 416) for a patient. DC values for the sensors may be determined, e.g., with $\text{IR}_{DC}$ 418 and $\text{Red}_{DC}$ 420 values, and may be used, along with power ratio 412, as well as other possible signals 422 from the $\text{SpO}_2$ algorithm application via the processor to calculate a metric (at 424) for modification (at 426) of the $\text{SpO}_2$ measurement from 416 to provide a corrected $\text{SpO}_2$ value at 428.

Figure 5:
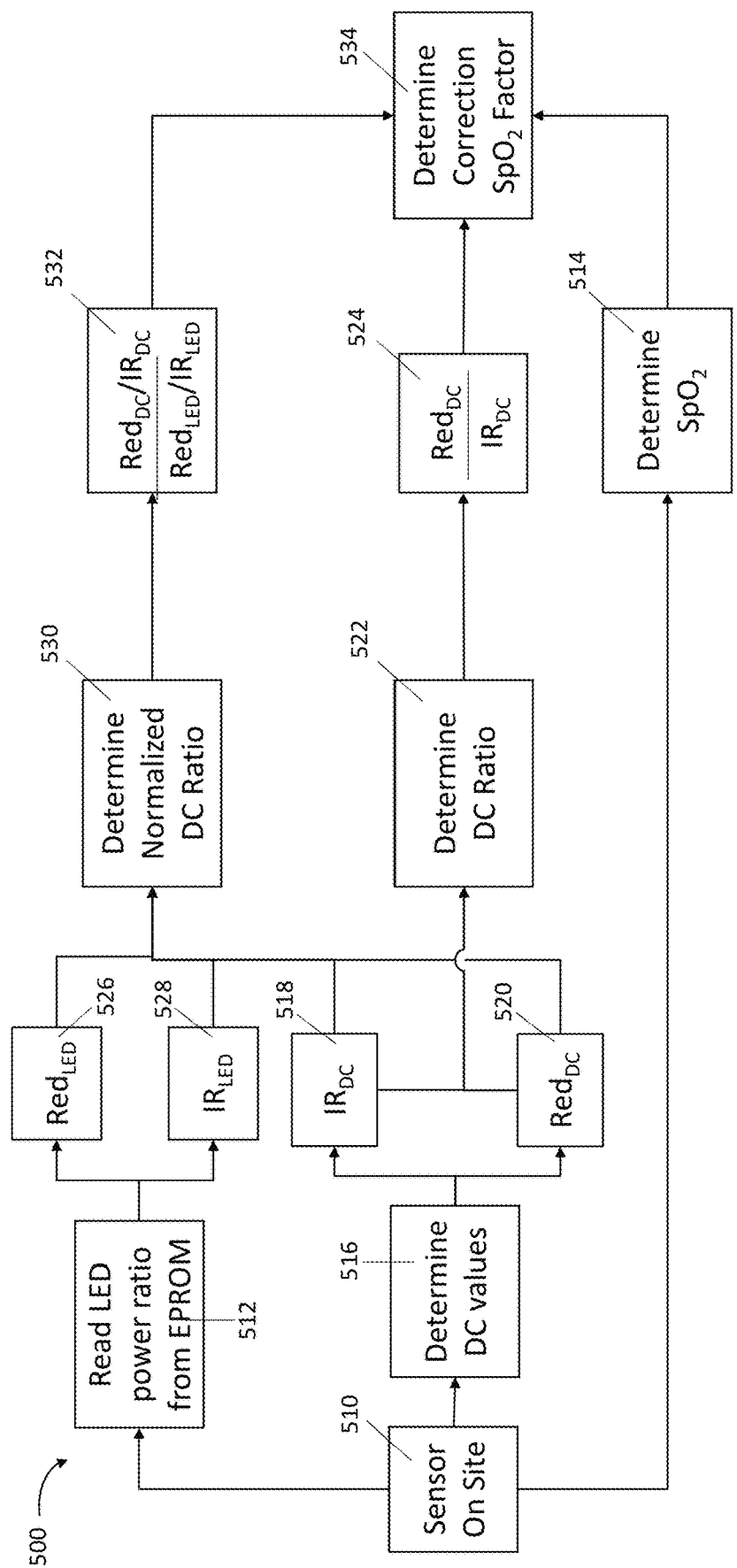
FIG. 5 is an exemplary flowchart illustrating determination of a correction factor for correction of $SpO_2$ measurements based on spectral characteristics of tissue.

FIG. 5 illustrates another exemplary flowchart generally at 500, wherein a patient sensor 510 includes memory (e.g., an EEPROM) with a power ratio stored thereon (see 512, as an EEPROM with a power ratio stored thereon). An $\text{SpO}_2$ algorithm is utilized, e.g., by a processor on a monitor or other location, to provide an $\text{SpO}_2$ measurement (at 514) for a patient. DC values 516 for the sensors may be determined, e.g., with $\text{IR}_{DC}$ 518 and $\text{Red}_{DC}$ 520 values, and may be used to determine a DC ratio (at 522), expressed as $(\text{Red}_{DC}/\text{IR}_{DC})$ (at 524). The power ratio 512 may also describe $\text{RED}_{LED}$ (526) and $\text{IR}_{LED}$ (528) values (which may be described as the measured total spectral flux from the Red and IR LEDs, respectively, which values may be stored on sensor memory, e.g., an EEPROM), used along with values 518 and 520 to determine a normalized DC ratio (at 530), expressed at 532 as $((\text{Red}_{DC}/\text{IR}_{DC})/(\text{Red}_{LED}/\text{IR}_{LED}))$. Values at 514, 524 and 532 may also be used to determine a correction $\text{SpO}_2$ factor 534.

In another exemplary embodiment, above-described or other signals or combinations of signals are combined with other algorithm signals to train a Neural Network classifier to improve detection, or with regard to a fuzzy logic or evolutionary or genetic or survival-of-the-fittest solution (e.g., a training regime that does not use gradient descent methods to find the multi-dimensional best solution). Exemplary signals include $\text{IR}_{DC}$(nAvs), $\text{Red}_{DC}$(nAvs), $\text{SpO}_2$, Ratio of Ratios (i.e., $(\text{Red}_{AC}/\text{Red}_{DC})/(\text{IR}_{AC}/\text{IR}_{DC})$), Percent Modulation IR (%), Percent Modulation Red (%) and Pulse Rate (bpm). Other pleth morphology signals may also be used—such as skewness, pulse amplitude (AC), pulse rate, kurtosis, ratios of fiducial points within the pulse or derivative signals, or other similar metrics.

In further exemplary embodiments, detection for the foregoing may also be utilized according to certain sensor types, sensor locations or subject populations (e.g. adult vs neonate). For example, the same effect may not present the same way for reflectance data (e.g. MAX-FAST™) versus finger sensor data (e.g. MAX-A™). In exemplary embodiments, sensor type or other hardware parameters are detected to determine which correction to apply.

In further exemplary embodiments, a threshold for detection can be derived by looking at distributions of historical data with known pigments and selecting a value that optimally separates the pigment group of interest from other groups.

In exemplary embodiments, once pigmentation is estimated or measured, the slope of saturation values can be corrected. There are plural possible techniques for such correction, including without limitation: modifying the slope of the saturation curve using coefficients (either newly generated coefficients or by way of modification of existing coefficients); modifying the saturation number directly; or modifying the ratio of ratios.

Figure 6:
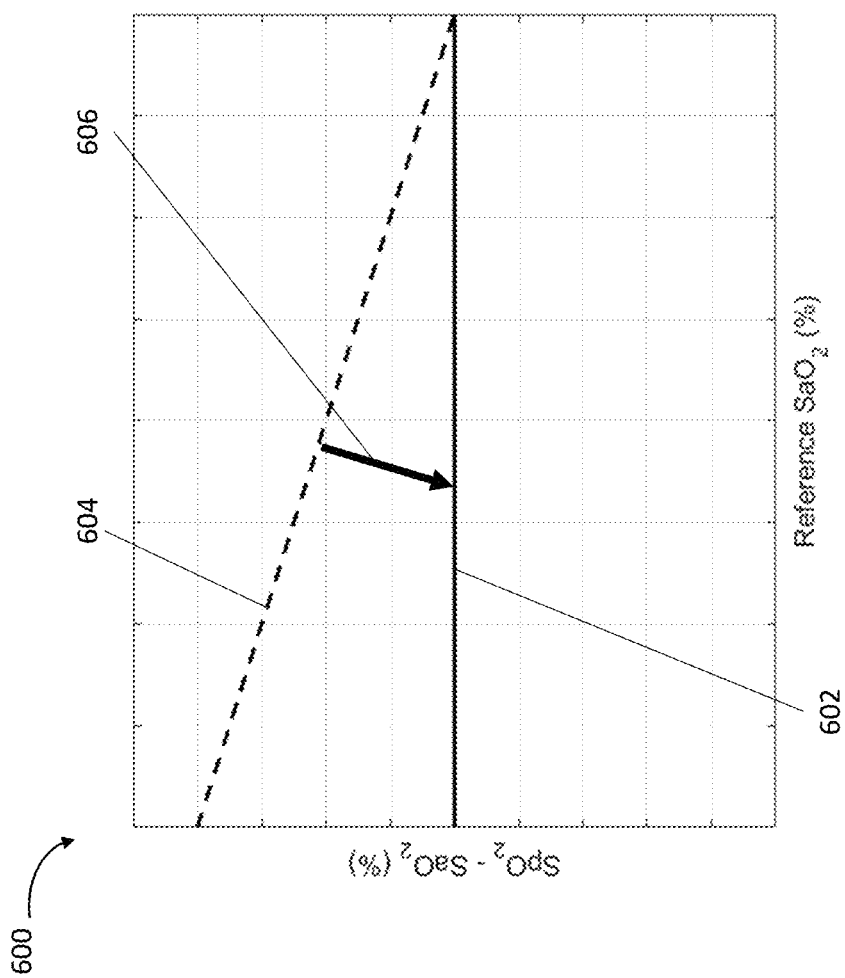
FIG. 6 is an exemplary plot illustrating $SpO_2$ error vs. $SaO_2$ (or error vs. path length) for different levels of tissue attenuation due to spectral characteristics, e.g., for lighter and very dark pigmented subjects, with application of a correction of error for spectral characteristics by modification of a slope value for very dark pigmented subjects.

In exemplary embodiments, such a modification can be a linear shift that reduces $\text{SpO}_2$ at lower saturations but does not modify the higher saturation values. FIG. 6 illustrates generally at 600 an exemplary plot of $\text{SpO}_2$ error vs. $\text{SaO}_2$ for two different levels of light attenuation due to spectral characteristics of tissue (e.g., skin pigmentation of four different levels, including light and darker, or very dark, pigmentation). In FIG. 6, line 602 is the least squares best fit line for lighter pigment; and line 604 is the least squares best fit line for darker pigment. In exemplary embodiments a modification in accordance with the above is shifting of the darker least squares best fit line 604 to approximately the same or similar slope as the lighter pigment best fit line 602, as at arrow 606, leading to significant improvement in accuracy at low $\text{SpO}_2$ values.

While such linear shifts are contemplated in accordance with the present disclosure, it should be recognized that other (non-linear) corrections can also be applied, as desired. Additionally, the slope between $\text{SpO}_2$ and $\text{SaO}_2$ may vary by subject and may represent a continuum rather than a single correction slope. The level of correction may also vary with the magnitude of the predictive metric.

Aspects described herein describe skin pigmentation as a tissue characteristic that can cause scattering or absorption of light during photoplethysmography (PPG) measurements. Other such tissue conditions include density, scarring, etc., can also cause or contribute to error. While certain mechanisms are described herein for correcting or for generating correction coefficients or algorithms to correct for skin pigmentation, such mechanisms may also be utilized to account for and/or to correct for other skin characteristics that can cause such scattering or absorption of light.

In exemplary aspects described herein, estimation based upon signal measurements can be performed in real time or periodically, to provide for dynamic correction of error due to skin characteristics that cause scattering or absorption of light, e.g., as a feedback loop or as part of a neural network.

Additional Mechanisms for Correcting for Errors Dependent Upon Spectral Characteristics of Tissue We refer to the co-owned U.S. Patent Application entitled "SYSTEM AND METHOD FOR CALIBRATING FOR ERRORS DEPENDENT UPON SPECTRAL CHARACTERISTICS OF TISSUE", U.S. patent application Ser. No. 17/958,788 (Publication No. US2023/0103406), filed concurrently herewith, the entire contents of which are incorporated herein by reference. Certain exemplary details from that application are also incorporated herein.

Further, in exemplary embodiments, skin characteristics may be estimated or measured and/or correction of error may be generated or modified while the sensor is on a particular patient, for example, using a reflective mode to generate one or more signals to correct for error due to tissue scattering or absorption of light. In such embodiments, the reflective mode shines one or more wavelengths of LED light on the surface of the skin, with a photodetector sensing the reflected light off of the surface of the skin. The ratio of reflected light may be used to determine the skin characteristics (e.g., melanin) and/or to provide for error correction. In exemplary embodiments, the PPG sensor is a pulse oximeter operating in reflective mode. In exemplary embodiments, a pulse oximeter may be first used in reflectance mode (e.g., using a calibration fixture, e.g., an adhesive liner or other device, and calibration mode configured to cause reflection of the LED off of the skin), then switched over to transmission mode. In other exemplary embodiments, the PPG sensor is a regional oximeter, such as an INVOS™ sensor, may be used in conjunction with a pulse oximeter.

In further exemplary embodiments, a reflected signal may be provided via regional oximetry or by pulse oximetry operating in reflective mode to measure the optical signal level of reflected light; and concurrently a measure of the modulated optical signals from via pulse oximetry provided, with both the signal level and the modulated signal level used to estimate the total hemoglobin in blood. For measure of hemoglobin, it is advantageous to utilize at least one wavelength around or greater than 1000 nanometers (nm), along with at least one detector capable of a response to wavelengths greater than 1000 nm, e.g, 1050 nm to 1550 nm (e.g., an Indium Gallium Arsenide (InGaAs) or Indium Gallium Arsenide Phosphide detector). In exemplary embodiments, a first source emits between about 600 nm and 900 nm, a second source emits about or above 1000 nm; and two detectors are placed in close proximity and placed in a parallel electrical circuit such that the output currents sum together. In additional exemplary embodiments with a third source for a reflected signal, a current divider with a potentiometer may be provided to reduce the current from the reflected signals (in case the signals saturate the front end).

In order to account for the effects of tissue scattering or absorption on the transmitted signal levels, the reflected optical signal measures the spectral characteristics of the tissue and is used to normalize the signal levels of the transmitted signals (to normalize relative differences between wavelength that are due to scattering losses of the tissue rather than blood). In such a way, exemplary techniques described herein may also be applied to other types of measurements, e.g., total hemoglobin or other types of hemoglobin, e.g, carboxyhemoglobin).

In further exemplary embodiments, additional wavelengths of light may be used to assess skin characteristics (e.g., pigmentation) by measuring $SpO_2$ with different sets of LED pairs, comparing readings and applying a correction factor based on the difference in those readings. In exemplary embodiments, a correction factor is applied to existing calibration coefficients based upon level of difference between the different estimates (two or more) of $SpO_2$. In further exemplary embodiments, the correction factor is applied assuming that the difference is due to the presence of a difference in pigmentation (or other skin characteristic) between the subject of interest and a representative patient population from which the coefficients were developed.

In further exemplary embodiments, three wavelengths of light may also be generated from two optical sources (e.g., LEDs) by driving the LEDs at high and low voltages (e.g, at the extremes of their drive currents), thus creating a shift in peak wavelength between readings made with high and low voltages so that at least two $SpO_2$ measurements are made with two pairs of peak wavelengths. This allows assessment of skin characteristics (e.g., pigmentation) by comparing readings and applying a correction factor based on the difference in those readings.

In further exemplary embodiments, an adhesive liner material (or other material in the optical path that results in a shift of the original wavelengths from their nominal value) is used in a calibration step, generating a first pair of peak wavelengths, with the liner removed to generate a second pair of peak wavelengths. This allows assessment of skin characteristics (e.g., pigmentation) by comparing readings and applying a correction factor based on the difference in those readings. In further exemplary embodiments, the adhesive itself provides the calibration first pair of peak wavelengths and attenuates (on its own or with manual intervention) to create the second pair of peak wavelengths.

In further exemplary embodiments, correction for errors due to skin characteristics that cause scattering or absorption of optical signals (e.g., pigmentation) are provided by modulating the optical signal through skin. In exemplary aspects, this relates to additional measurements made during pulse oximetry where the amount of light that interacts with the skin has been modulated. This may be done, e.g., by mechanically modulating the optical interaction with the skin, such as using an acoustic signal (e.g., ultrasound) that interacts with the skin, through motion, e.g., tapping the sensor, movement of the body with the sensor, etc. In exemplary embodiments, the sensor makes two independent readings where the light propagation through the skin has changed, allowing isolation/estimation of the optical signal due to such skin characteristics and correction of the error that is associated therewith (e.g., by modifying a calibration coefficient, curve or algorithm).

In further exemplary embodiments, light interaction with the skin is modulated optically (noting that skin is optically anisotropic and has a strong preference for forward scatter). In exemplary aspects, light is injected from the sensor source into the skin at two different angles, providing different optical interactions with the skin. In exemplary embodiments, this injection of light at different angles are provided, e.g., by one or more of: multiple LEDs, lenses to control optical emission, a removable layer placed over LEDs, etc.

In some embodiments, the physiological monitoring system may comprise a sensor configured to store algorithm configuration data, which may be algorithm coefficient(s), and generate a photoplethysmography (PPG) signal. A port (e.g., a bi-directional input/output) may be communicatively coupled to the sensor and may be configured to receive an algorithm configuration data and the PPG signal from the sensor. At least one processor may be configured to configure or modify at least a part of the first algorithm based upon the algorithm configuration data received by a monitor from the sensor and to execute the first algorithm as configured or modified to determine at least one physiological parameter of a subject based on the PPG signal. The at least one processor may further be configured to delete the algorithm configuration data from the monitor, or deactivate the configuration or modifications of the first algorithm after the sensor becomes communicatively disconnected from the port. By providing algorithm configuration data on the sensor, new algorithm configurations may be provided to the monitor without the need for afield update of all installed monitors. Rather, the sensor may carry the most updated configuration data to the monitor for execution during patient monitoring, providing a higher quality calculation of patient parameters than otherwise would be possible without the algorithm configuration data. Additionally, different types of sensors may have different capabilities, which can be reflected in the algorithm configuration data they carry.

In some embodiments, a physiological sensor may be provided. The physiological sensor may comprise at least one light source configured to generate a light signal, at least one light detector configured to receive the light signal after the light signal has been attenuated by body tissue of a subject, and non-transitory memory (e.g., integrated memory) configured to store algorithm configuration data. The physiological sensor may further comprise a port. The port may comprise a bi-directional input/output port, a wireless interface, NFC (near field communication) interface, RFID link, one-wire interface, I2C, SPI, UART, or any other type of a port or communication interface. In some embodiments, the port may also have other capabilities. For example, the port may comprise an output of a photodetector capable of transmitting PPG data. The port may be configured to transmit the light signal to a physiological monitor that is communicatively coupled to the port and to transmit algorithm configuration data to the physiological monitor, which is configured to execute an executable code segment stored on the physiological monitor, as configured or modified by the algorithm configuration data received from the sensor to determine at least one physiological parameter of the subject based on the light signal. The algorithm configuration data may be deleted, or algorithm configurations or modifications may be deactivated after the physiological monitor becomes communicatively disconnected from the sensor. In some embodiments, the physiological monitor may become communicatively disconnected from the sensor, for example, when the sensor is physically disconnected form the physiological monitor, or when the sensor is moved out of the wireless range of the physiological monitor.

In some embodiments a physiological monitoring system may be provided. The physiological monitoring system may comprise a sensor that is configured to store algorithm configuration data and generate a photoplethysmographic (PPG) signal. The physiological monitoring system may further comprise a physiological monitor. The physiological monitor may comprise a port that is communicatively coupled to the sensor and is configured to receive the algorithm configuration data and the PPG signal from the sensor. The physiological monitor may comprise non-transitory memory configured to store a sequence of ordered algorithm stages wherein one of the algorithm stages comprises a configurable algorithm stage, the configurable algorithm stage comprising a plurality of alternative executable code segments.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

What is claimed is:

1. A medical monitoring system, comprising:
   a sensor comprising:
      a light emitter to emit light; and
      a light detector to detect the light; and
   a monitor comprising:
      a port to communicatively couple to the sensor to receive a sensor signal from the sensor, wherein the sensor signal is based on the light detected by the light detector;
      a display;
      monitor processing circuitry; and
      a monitor memory comprising first instructions that, when executed by the monitor processing circuitry, cause the monitor processing circuitry to:
         determine a physiological parameter based on the sensor signal;
         determine one or more input signals based on the sensor signal, wherein the one or more input signals comprise a ratio of direct current (DC) components;
         determine a correction factor based on the ratio of DC components; and
         adjust the physiological parameter based on the correction factor.

2. The medical monitoring system of claim 1, wherein the one or more input signals comprise at least one of a ratio-of-ratios, infrared (IR) percent modulation, or red percent modulation, and the monitor processing circuitry is configured to determine the correction factor based on the ratio of DC components and the at least one of the ratio-of ratios, the IR percent modulation, or the red percent modulation.

3. The medical monitoring system of claim 1, wherein the sensor comprises a sensor memory comprising second instructions that, when executed by sensor processing circuitry, cause the sensor processing circuitry to store a power ratio for the sensor.

4. The medical monitoring system of claim 3, wherein the sensor memory comprises an erasable programmable read-only memory (EPROM), and wherein the second instructions, when executed by the sensor processing circuitry, cause the sensor processing circuitry to store the power ratio for the sensor.

5. The medical monitoring system of claim 3, wherein the first instructions, when executed by the monitor processing circuitry, cause the monitor processing circuitry to determine a normalized version of the ratio of DC components based on the power ratio.

6. The medical monitoring system of claim 1, wherein the correction factor comprises a modification of a slope of a saturation curve or a ratios-of-ratios.

7. The medical monitoring system of claim 1, wherein the correction factor comprises a modification to a saturation value.

8. The medical monitoring system of claim 1, wherein the first instructions, when executed by the monitor processing circuitry, cause the monitor processing circuitry to input at least one of the one or more input signals to a neural network to determine the correction factor.

9. The medical monitoring system of claim 1, wherein the physiological parameter comprises oxygen saturation.

10. The medical monitoring system of claim 1, wherein the first instructions, when executed by the monitor processing circuitry, cause the monitor processing circuitry to instruct presentation of the adjusted physiological parameter on the display.

11. The medical monitoring system of claim 1, wherein the sensor comprises a sensor memory comprising second instructions that, when executed by sensor processing circuitry, cause the sensor processing circuitry to store a calibration coefficient.

12. The medical monitoring system of claim 11, wherein the first instructions, when executed by the monitor processing circuitry, cause the monitor processing circuitry to determine the correction factor based on the calibration coefficient.

13. A method of operating a medical monitoring system, comprising:

receiving, at a processor and from a sensor, a sensor signal indicative of light detected by a detector of the sensor;

determining, via the processor, a physiological parameter based on the sensor signal;

determining, via the processor, one or more input signals based on the sensor signal, wherein the one or more input signals comprise a ratio of direct current (DC) components;

determining, via the processor, a correction factor based on the ratio of DC components; and adjusting, via the processor, the physiological parameter based on the correction factor.

14. The method of claim 13, comprising inputting, via the processor, at least one of the one or more input signals to a neural network to determine the correction factor.

15. The method of claim 13, comprising averaging, via the processor, at least one of the one or more input signals over a period of time.

16. The method of claim 13, wherein the light comprises red light and infrared (IR) light, and the method comprises:

determining the ratio of DC components based on the red light and the IR light.

\* \* \* \* \*